(12) United States Patent
Pawlenko et al.

(10) Patent No.: US 7,629,551 B2
(45) Date of Patent: Dec. 8, 2009

(54) AUTOMATIC RECYCLING OF EXHAUST TUBES FOR FIBER OPTICS

(75) Inventors: Ivan Pawlenko, Holland, PA (US); Larry Samson, Langhorne, PA (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 450 days.

(21) Appl. No.: 11/329,581

(22) Filed: Jan. 11, 2006

(65) Prior Publication Data

US 2007/0157950 A1    Jul. 12, 2007

(51) Int. Cl.
*B07C 5/342* (2006.01)
(52) U.S. Cl. .................. 209/580; 209/552; 209/576
(58) Field of Classification Search .......... 209/552, 209/576, 577, 578, 579, 580, 586
See application file for complete search history.

(56) References Cited

U.S. PATENT DOCUMENTS

| | | | | |
|---|---|---|---|---|
| 5,495,797 A | * | 3/1996 | Meulnart ................. 99/637 |
| 5,829,222 A | * | 11/1998 | Schlagel et al. ............ 53/54 |
| 6,610,953 B1 | * | 8/2003 | Tao et al. ................. 209/577 |
| 6,881,907 B2 | * | 4/2005 | Winkelmolen ............ 177/145 |
| 7,200,458 B2 | * | 4/2007 | Carman et al. ........... 700/117 |
| 2002/0067603 A1 | * | 6/2002 | Driscoll et al. ............ 362/5 |

* cited by examiner

*Primary Examiner*—Patrick H Mackey
*Assistant Examiner*—Kalyanavenkateshware Kumar
(74) *Attorney, Agent, or Firm*—Carmen Patti Law Group, LLC

(57) ABSTRACT

An apparatus and method of recycling exhaust tubes used to manufacture optical fiber includes the automated use of 1) a machine vision system that signals a conveyor system when to stop so that a cutting machine will cut contaminates and discoloration from an exhaust tube at the correct place and provides an indication on whether the exhaust tube is reusable, 2) a conveyor system to transport reusable exhaust tubes to different stations, and 3) a robotic arm to load exhaust tubes onto the conveyor system, and unload exhaust tubes from the conveyor system.

18 Claims, 3 Drawing Sheets

AUTOMATIC RECYCLING OF EXHAUST TUBES FOR FIBER OPTICS

TECHNICAL FIELD

This invention relates to the art of fiber optic manufacture.

BACKGROUND OF THE INVENTION

In the manufacture of optical fiber, the glass rod from which the fiber is drawn is formed using a multi-step process. First and second glass tubes, known as exhaust tubes, are each held in place via a lathe machine equipped with a heat torch. One end of a hollow glass tube, or a hollow quartz tube, which may be known as a starter tube, is fused to one end of the first exhaust tube. The opposite end of the starter tube is fused to one end of the second exhaust tube. Typically, the exhaust tubes are a) approximately 2 inches in diameter and b) larger than the starter tube. The difference in size between the exhaust tubes and the starter tube requires that the end of each exhaust tube that is fused to the starter tube be tapered in order to match the diameter of the starter tube. More precisely, it is preferable that the exhaust tubes each be shaped to narrow at a prescribed angle, e.g., 90°, 1) to facilitate a good connection between the ends of the starter tube and the ends of the exhaust tubes, and 2) to insure proper rotation of the combined tubes in the lathe machine.

Once the exhaust tubes and the starter tube are fused together, the starter tube is heated while gas is pumped from one side of the lathe machine into the end of the first exhaust tube that is not fused to the starter tube. The gas exits the first exhaust tube at the fused end, flows through the starter tube, then flows through the second exhaust tube, flowing from its fused end to its free end, and ends at the opposite end of the lathe machine. The heating of the gases solidifies the starter tube. After six to eight hours of heating in the presence of flowing gas, the starter tube is cooled until it becomes a solid rod. The ends of each exhaust tube that are fused to the solid rod are cut to remove the solid rod, and the solid rod is processed further to become optical fiber.

An optical fiber manufacturing plant that operates, for example, 100 lathe machines 24 hours per day, using 2 exhaust tubes per lathe machine per solid rod, with a 6 to 8 hour cycle time to manufacture a solid rod, requires 600 to 800 exhaust tubes per day. Recycling the exhaust tubes so that they may be reused lowers the number of new exhaust tubes that are needed per day, as well as the overall cost of manufacturing optical fiber. Although a short portion of the exhaust tube is lost when the rod is removed, the remaining portion may be recycled and repeatedly reused until the length after separation from the rod is insufficient to function as an exhaust tube.

The process of recycling exhaust tubes begins by making a second cut near the edges of each exhaust tube to remove any portions of each exhaust tube that may contain contaminates and discoloration from the heating and gases used to manufacture the solid rod. The angle of the cut is very important, because failure to cut the exhaust tube at a perpendicular angle will prevent a good connection from being made between the exhaust tube and the next starter tube to which the exhaust tube will be fused, rendering the exhaust tube unusable. Disadvantageously, presently, the determination of how much of each exhaust tube should be cut, along with the actual cutting, is performed by a person. After being properly cut, it must be determined whether the remaining length of exhaust tube is sufficient for reuse. Also, each exhaust tube must be inspected to insure that it is undamaged and may be reused. Disadvantageously, the measuring and inspecting steps are also performed manually. Manually measuring and cutting often results in too much of the exhaust tube being cut, thereby reducing the size of the exhaust tube that remains for future reuse, and resulting in the premature discarding of reusable exhaust tubes.

The remaining portions of reusable exhaust tubes are transported, e.g., by a person using a cart, to a processing area to be cleaned. The cleaning process should remove any contaminates and discoloration that were not cut off and remain after the manufacture of the solid rod. The cleaning is, disadvantageously, a manual process. Typically, it takes between 5 and 10 minutes to complete the cleaning of an exhaust tube. During the cleaning, each exhaust tube is soaked in a chemical mixture, scrubbed by hand with a steel brush, rinsed, and then scrubbed again by hand to remove any chemical residue. Further, disadvantageously, the cleaning process involves the use of chemicals that are harmful to humans if inhaled.

SUMMARY OF THE INVENTION

We have recognized that the problems of the prior art in performing the recycling process for exhaust tubes can be overcome, in accordance with the principles of the invention, by an automated transport system operated in conjunction with a machine vision system along with at least one robotic arm. More specifically, the automated transport system uses 1) a machine vision system that automatically controls when a conveyor system stops so that a cutting machine will cut contaminates and discoloration from an exhaust tube at the correct place and that provides an indication on whether the exhaust tube is reusable, 2) a conveyor system to transport reusable exhaust tubes to different stations, 3) a robotic arm to load exhaust tubes onto the conveyor system, and unload exhaust tubes from the conveyor system, and 4) a cleaning tub for a chemical wash of exhaust tubes. Optionally, a mobile robotic arm may be used in lieu of the conveyor system.

Advantageously, due to the machine vision system, the position of cuts made on exhaust tubes are more accurate, resulting in more reusable exhaust tubes, and a higher reuse rate for each exhaust tube. More accurate cuts can be made because the machine vision system maintains a continuous level of performance over time, whereas the performance of a human being deteriorates over time due to fatigue and/or the monotony of performing repetitive tasks. Also, advantageously, due to the machine vision system's ability to control the conveyor system to automatically stop for a cutting machine, more accurate cutting of contaminated and discolored areas of exhaust tubes is achieved. Further advantageously, due to the robotic arm, conveyor system and cleaning tub, manual intervention is reduced, resulting in shorter exhaust tube recycle times, reduced defect rates, and reduced risk of workplace injuries from the inhalation of harmful chemical fumes.

In one implementation, used exhaust tubes are taken individually from a cart and placed by a robotic arm onto a conveyor belt to be transported to different stations along the conveyor belt. A machine vision system may be used to automatically inspect the used exhaust tubes to ensure that each exhaust tube has an acceptable length and define at which point the exhaust tube is free of defects, e.g., areas of discoloration on the edges of the used exhaust tubes. Unacceptable exhaust tubes may be removed from conveyor belt by a robotic arm and discarded. Acceptable exhaust tubes may be allowed to continue on the conveyor belt to an automatic cutting station.

Upon arrival at an automatic cutting station, the robotic arm places the exhaust tubes on the cutting machine, and the machine vision system signals the conveyor belt when to stop in order for the cutting machine to cut one edge of each of the exhaust tubes at the correct position to remove contaminates and discoloration that cannot be cleaned. After cutting, the robotic arm places the exhaust tubes on the conveyor belt to be transported to a cleaning station.

Upon arrival at the cleaning station, the robotic arm takes each exhaust tube from the conveyor belt and places it onto a brush in a cleaning tub. A cover to the cleaning tub holds the exhaust tube in place when closed and prevents chemicals used in the washing from spilling from the cleaning tub. Each brush rotates inside the exhaust tube to scrub the exhaust tube with a chemical mixture. After the cleaning, the robotic system removes the exhaust tube from the cleaning tub and places it on the conveyor system to be transported to a storage bin to await reuse.

DETAILED DESCRIPTION

Figure 1:
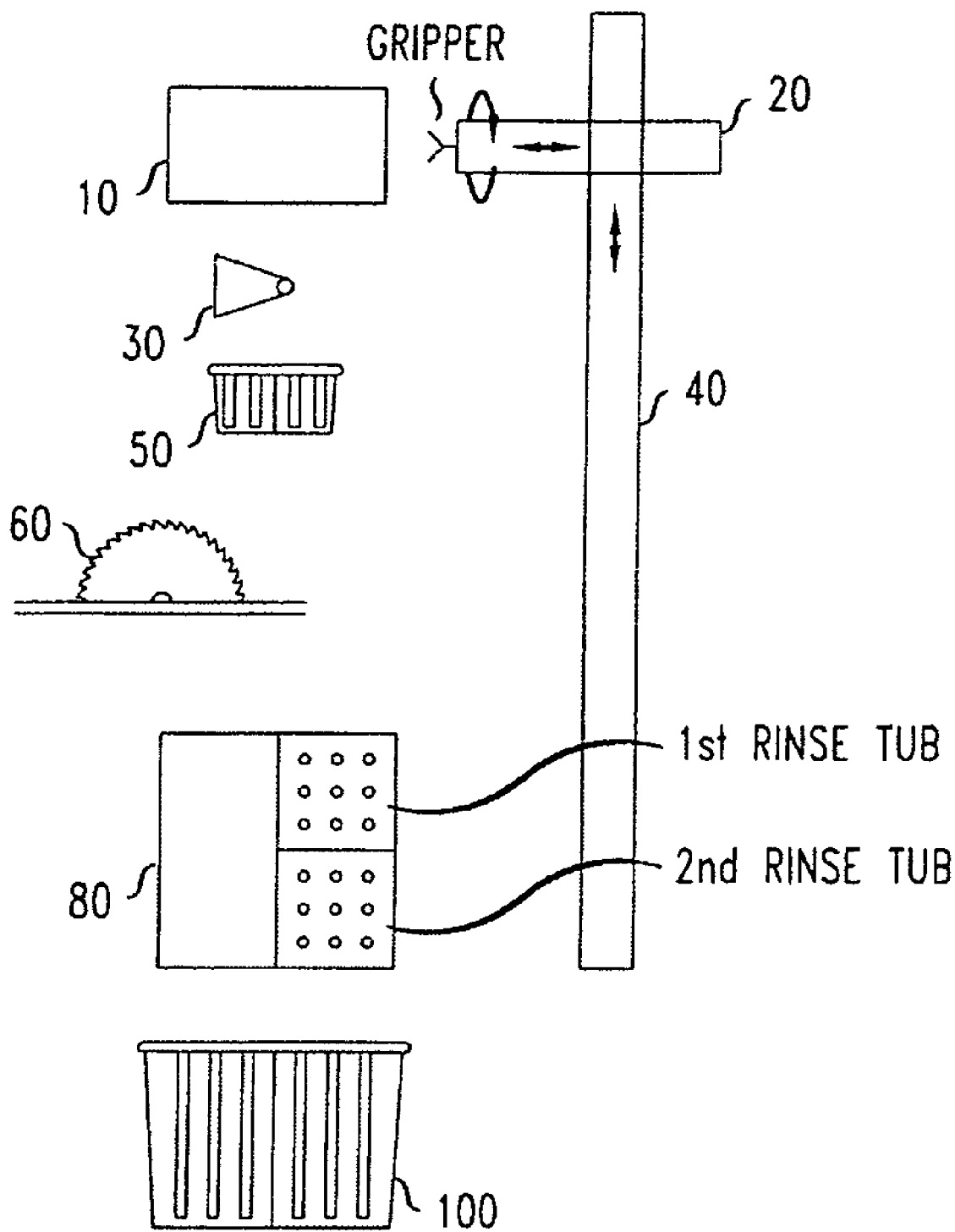
FIG. 1 shows a top view of an exemplary automatic exhaust tube recycling process arranged in accordance with the principles of the invention.

FIG. 1 shows a top view of an exemplary automatic exhaust tube recycling process arranged in accordance with the principles of the invention. More particularly, shown in FIG. 1 are cart 10, robotic arm 20, machine vision system 30, conveyor belt 40, reject bin 50, cutting machine 60, cleaning tub 80 and storage bin 100.

Robotic arm 20 is a robotic arm as used in industrial manufacturing operations. In one implementation, robotic arm 20 may be an Adept Cobra s800 SCARA robot manufactured by Adept Technology, Inc. of Livermore, Calif. Robotic arm 20 may be programmed to move objects, such as exhaust tubes, from one point to another, e.g., grab exhaust tubes from cart 10, release exhaust tubes into reject bin 50, move vertically up or down to lift or lower objects, move forward and back along an arc, and clockwise or counter clockwise. The gripper of robotic arm 20 is capable of lifting and moving one exhaust tube at a time.

Machine vision system 30 is a machine vision system as used in industrial manufacturing operations. In one implementation, machine vision system 30 may be an In-Sight 5400 vision system manufactured by Cognex Corporation of Natick, Mass. Machine vision system 30 is able to provide a more consistent level of inspection over any period of time than a human being, whose performance may deteriorate over time due to fatigue and/or the monotony of performing repetitive tasks. In one embodiment, machine vision system 30 may be programmed to look at different levels of discoloration, ranging from transparent to gray to dark gray or black, and different quantities of defects, e.g., incrustations deposited on the exhaust tube or particles attached inside the exhaust tube. In another embodiment, machine vision system 30 may make a digitized picture of an exhaust tube, and perform image processing to determine whether the exhaust tube has a) a transparent surface, and is thus reusable or b) areas of discoloration and/or defects. When areas of discoloration and/or defects are identified on used exhaust tubes, machine vision system 30 may be used to a) determine how many of these defects are permissible and b) identify the area needed to be cut from the exhaust tube.

Machine vision system 30 may have preprogrammed information concerning the minimum required length for an exhaust tube. This capability allows machine vision system 30 to determine more accurately than a human being which exhaust tubes have an acceptable length for reuse prior to removal of defective portions. Thus, a higher reuse rate for each exhaust tube is attainable.

Machine vision system 30 may be used to control robotic arm 20 to a) move exhaust tubes to and from conveyor belt 40 and b) discard unacceptable exhaust tubes into reject bin 50. Also, machine vision system 30 may be used to control conveyor belt 40 when to stop so that cutting machine 60 may cut the edges of the exhaust tubes at the correct position, rather than the prior art method of human observation of a correct position and manual cutting at the position. Furthermore, machine vision system 30 may be used to control the placement of exhaust tubes onto appropriately sized brushes in cleaning tub 80 and to control the cleaning of exhaust tubes in cleaning tub 80.

Machine vision system 30 may be able to operate with less light than is required by a human being to inspect exhaust tubes. Thus, machine vision system 30 does not need an environment that has adequate lighting for visual perception by a human being.

Machine vision system 30 may be mounted on robotic arm 20 or it may be mounted separately elsewhere. Those of ordinary skill in the art will readily be able to decide on an appropriate location for mounting such a system.

Conveyor belt 40, located in close proximity to the robotic arm 20, is a conveyor belt as used in industrial manufacturing operations. In one implementation, conveyor belt 40 may be a Plylon® conveyor belt manufactured by Goodyear Tire & Rubber Company of Akron, Ohio. Conveyor belt 40 is a flat belt capable of supporting the weight of several exhaust tubes at a time. Conveyor belt 40 may have constant or variable speed capability and a width of at least 12 inches. The length of conveyor belt 40 will vary in accordance with the required size of the room and distance between stations along conveyor belt 40. Conveyor belt 40 transports exhaust tubes to different stations, such as a cutting station and a cleaning station. Those of ordinary skill in the art will readily be able to select conveyor belts of appropriate length and weight supporting strength.

Cutting machine 60 is a saw used in industrial manufacturing operations or equivalent, and is equipped with a special blade for cutting exhaust tubes. In one implementation, cutting machine 60 may be a SMART CUT™ series Precision Diamond Saw manufactured by UKAM Industrial Superhard Tools of Valencia, Calif. Cutting machine 60 is movable and may be moved to cut exhaust tubes at different positions. Cutting machine 60 is located at the cutting station along conveyor belt 40.

Cleaning tub 80 is a compartmentalized tub for washing and rinsing objects, such as exhaust tubes. Cleaning tub 80 has a first compartment with several brushes and fixtures for dispensing a chemical to automatically wash several exhaust tubes at a time, rather than the prior art method of manually washing only one exhaust tube at a time. Also, cleaning tub 80 has a second compartment which may be used for a first rinse of the exhaust tubes after the chemical wash, and a third compartment which may be used for a second rinse of the exhaust tubes. Cleaning tub 80 is located at the cleaning station along conveyor belt 40.

In operation, used exhaust tubes are taken from cart 10 and placed by robotic arm 20 onto conveyor belt 40 to be transported to different stations along conveyor belt 40. Machine vision system 30 may be used to automatically inspect the used exhaust tubes to ensure that each exhaust tube has an acceptable length and is free of defects, e.g., areas of discoloration on the edges of the used exhaust tubes. Unacceptable exhaust tubes may be removed from conveyor belt 40 by robotic arm 20 and discarded in reject bin 50. Acceptable exhaust tubes may be allowed to continue on conveyor belt 40 to an automatic cutting station.

Upon arrival at the automatic cutting station, robotic arm 20 places the exhaust tubes on cutting machine 60, and machine vision system 30 controls conveyor belt 40 when to stop in order for cutting machine 60 to cut one edge of each of the exhaust tubes at the correct position to remove contaminates and discoloration that cannot be cleaned. After the cutting, robotic arm 20 places the exhaust tubes on conveyor belt 40 to be transported to a cleaning station.

Upon arrival at the cleaning station, robotic arm 20, under the control of machine vision system 30, picks up one exhaust tube at a time from conveyor belt 40 and places it onto a brush located in the chemical washing compartment of cleaning tub 80. The capacity of cleaning tub 80 may accommodate at least 6 exhaust tubes. A cover to cleaning tub 80 holds the exhaust tube in place when closed and prevents chemicals used in the washing from spilling from cleaning tub 80. Each brush rotates inside an exhaust tube to scrub the exhaust tube with chemicals. A scrub lasts for a predetermined period, e.g., 30 seconds, however the time needed for the scrub may be varied as needed. After the scrub, robotic arm 20 places the exhaust tube into each of cleaning tub 80's two rinsing compartments to be rinsed to remove residue from the chemicals. After rinsing, robotic arm 20 removes the exhaust tube from cleaning tub 80 and places it onto conveyor belt 40 to be transported to storage bin 100 to await reuse.

Figure 2:
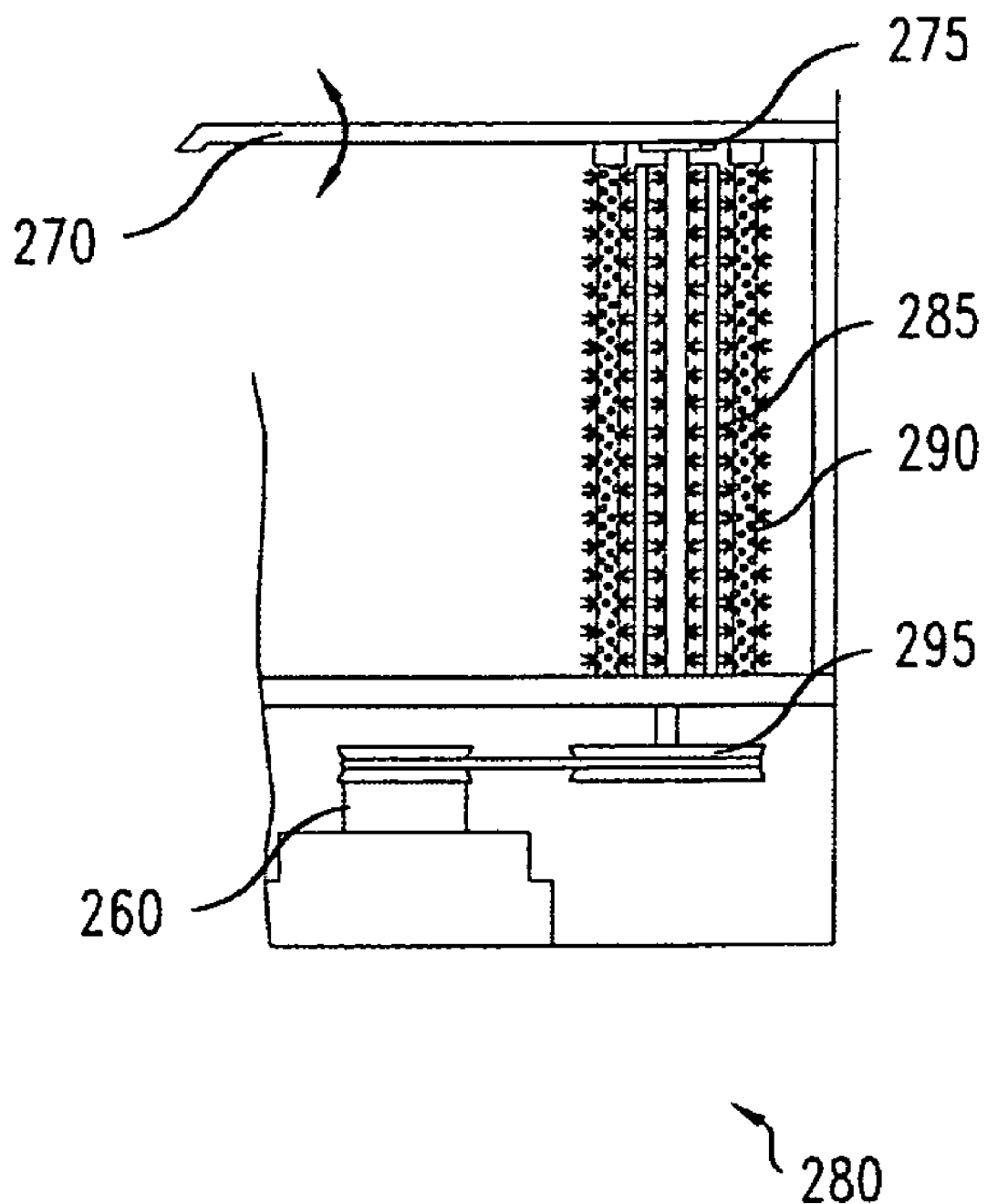
FIG. 2 depicts a portion of an exemplary cleaning tub illustrating a scrubbing mechanism arranged in accordance with the principles of the invention.

FIG. 2 shows a portion of a cleaning tub illustrating a scrubbing mechanism arranged in accordance with the principles of the invention. Shown in FIG. 2 is a side view of cleaning tub 280, which has cover 270, spindle mechanism 275, exhaust tube 285, pulley 295 and motor 260.

Cover 270 is attached to the body of cleaning tub 280. Cover 270 opens and closes to hold exhaust tube 285 in place on spindle mechanism 275, and cover 270 prevents chemicals used in scrubbing exhaust tube 285 from spilling from cleaning tub 280. The cover to cleaning tub 80 may be under the control of machine vision system 30.

Spindle mechanism 275 is the housing that holds in place spindle brushes used to scrub the exhaust tubes. Spindle mechanism 275 has openings on its outer extremity, which permit chemicals to flow outward onto the spindle brushes attached to spindle mechanism 275 when motor 260 is operating. The spindle brushes may be used to scrub exhaust tubes having different diameters. Exhaust tubes may rotate around the spindle brushes for a predetermined interval while the spindle brushes are held in a fixed position, or the spindle brushes may rotate inside the exhaust tubes for a predetermined interval while the exhaust tubes are held in a fixed position as they scrub the exhaust tubes. In addition, other brushes may be used to scrub the outsides of the exhaust tubes.

Pulley 295, connected to spindle mechanism 275 and motor 260, is a wheel with a grooved rim and a belt. The belt is pulled to change the direction of the pulley, permitting spindle mechanism 275 to move. Spindle mechanism 275 may rotate in either a clock-wise or counter clockwise direction when motor 260 is operating and turning the belt of pulley 295.

Figure 3:
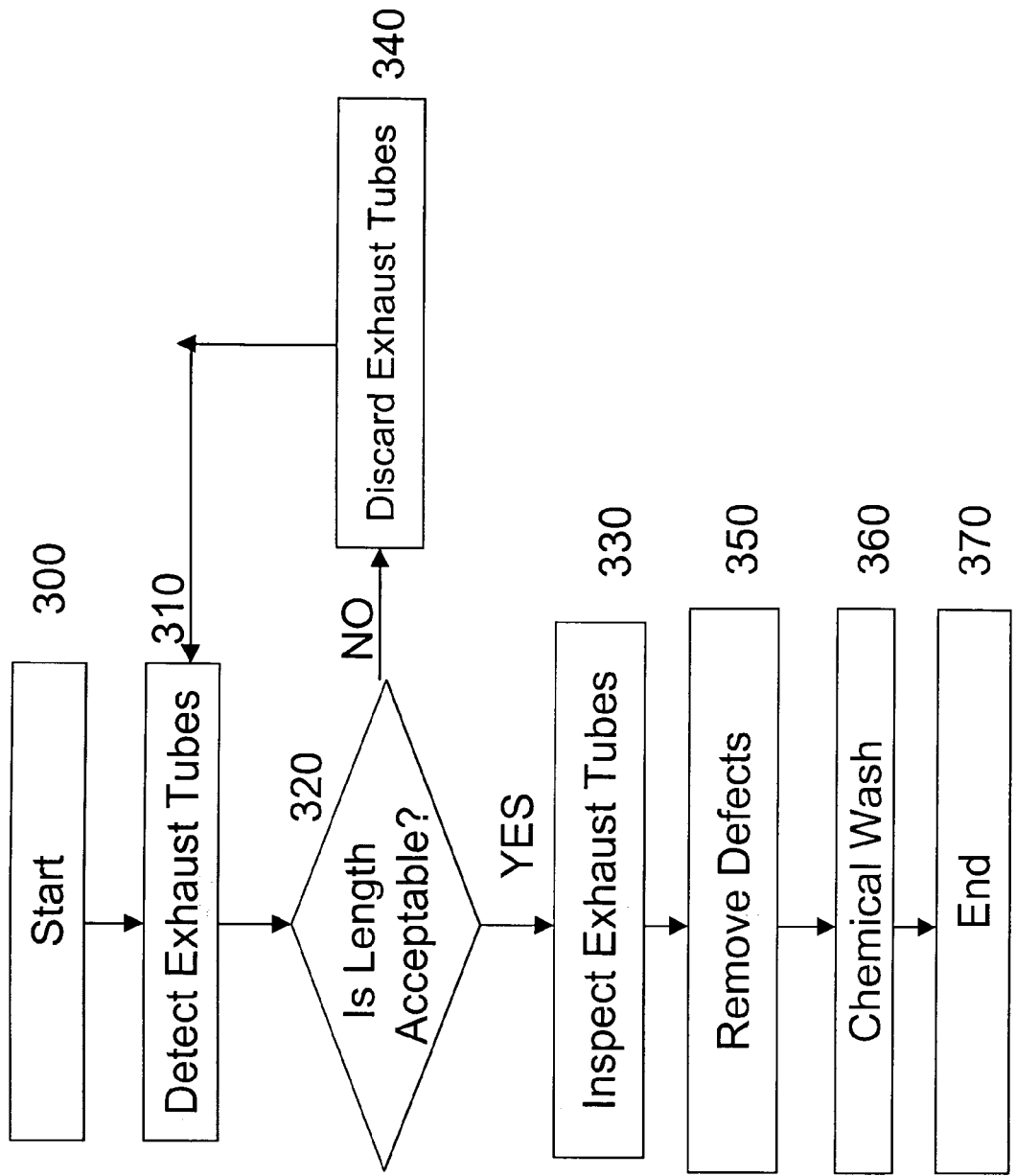
FIG. 3 shows a flow chart for a method of operating an automatic exhaust tube recycling process arranged in accordance with the principles of the invention.

FIG. 3 shows a flow chart of the operation of the automatic exhaust tube recycling process in accordance with the principles of the present invention. The process is entered in step 300 when a used exhaust tube is moved along conveyor belt 40 (FIG. 1).

In step 310 (FIG. 3), machine vision system 30 (FIG. 1) emits a light, which, when disrupted, indicates the presence of an exhaust tube. Upon sensing the exhaust tube, machine vision system 30 stores the exhaust tube's position and sends a message containing the exhaust tube's position to robotic arm 20.

In step 320 (FIG. 3), it is necessary to determine whether the length of the exhaust tube is acceptable. Machine vision system 30 (FIG. 1) determines whether the exhaust tube has the minimum required length for reuse.

If the test result in conditional branch point 320 (FIG. 3) is YES, indicating that the length of the exhaust tube is acceptable, then control is passed to step 330. In step 330, machine vision system 30 (FIG. 1) inspects the exhaust tube for discoloration and defects. Also, machine vision system 30 scans the exhaust tube and determines what part of the exhaust tube is to be cut. Thereafter, control passes to step 350 (FIG. 3). If the test result in step 320 is NO, indicating that the length of the exhaust tube is not acceptable, then control is passed to step 340. In step 340, robotic arm 20 (FIG. 1) discards the exhaust tube in reject bin 50, and control is passed to step 370 (FIG. 3).

In step 350, machine vision system 30 (FIG. 1) instructs robotic arm 20 as to where to place the exhaust tube in reference to cutting machine 60. After robotic arm 20 has positioned the exhaust tube for cutting, machine vision system 30 instructs cutting machine 60 to begin the cut. After the cutting is complete, machine vision system 30 instructs robotic arm 20 to place the exhaust tube on conveyor belt 40 for delivery to cleaning tub 80, or optionally, robotic arm 20 may deliver the exhaust tube to cleaning tub 80.

In step 360 (FIG. 3), robotic arm 20 (FIG. 1), under the control of machine vision system 30, places the exhaust tube onto an appropriate sized brush in cleaning tub 80 for a chemical wash and rinse. After the cleaning and rinsing, robotic arm 20 places the exhaust tube onto conveyor belt 40 to be transported to storage bin 100 to await reuse.

The process is exited in step 370 (FIG. 3).

Those skilled in the art will recognize that embodiments of the invention may have transporting means other than a conveyor belt. For example, depending on the distance between stations, a robotic arm, rather than a conveyor belt, may be used to carry the exhaust tubes between stations. Also, robotic arm 20 may be multiple robotic arms positioned along conveyor belt 40. Furthermore, a laser rather than a saw may be used to cut the edges of the exhaust tubes.

The foregoing merely illustrates the principles of the invention. It will thus be appreciated that those skilled in the art will be able to devise various arrangements, which, although not explicitly described or shown herein, embody the principles of the invention, and are included within its spirit and scope.

The invention claimed is:

1. A method of recycling a plurality of exhaust tubes used in manufacturing optical fiber, comprising the steps of:
    determining, using image processing, which of said plurality of exhaust tubes are reusable;
    transporting, using a first mechanized transport means, reusable exhaust tubes to a cutting station;

cutting, at a prescribed angle, one edge of each of said reusable exhaust tubes received at said cutting station such that identified contaminates and discoloration that cannot be cleaned are removed from said edge of each of said reusable exhaust tubes, wherein a position for said cutting of said one edge of each of said reusable exhaust tubes to remove said identified contaminates and discoloration is determined via said image processing;

transporting, using a second mechanized transport means, said reusable exhaust tubes to a cleaning station; and automatically cleaning said reusable exhaust tubes received at said cleaning station.

2. The method of claim 1 wherein said determining step further comprises the step of measuring a length of each of said plurality of exhaust tubes and determining whether said length exceeds a minimum required length for reuse of an exhaust tube.

3. The method of claim 1 wherein said determining step further comprises the step of inspecting each of said plurality of exhaust tubes having an acceptable length for reuse.

4. The method of claim 1 wherein at least one of said first mechanized transport means and said second mechanized transport means is selected from the group consisting of a conveyor belt and a robotic arm.

5. The method of claim 4 wherein said transporting step further comprises the steps of:

stopping said first mechanized transport means at said cutting station;

positioning said reusable exhaust tubes for said cutting; and starting said first mechanized transport means after said reusable exhaust tubes have been cut.

6. The method of claim 5 wherein said transporting step further comprises the steps of:

stopping said second mechanized transport means at said cleaning station;

removing said reusable exhaust tubes from said second mechanized transport means into a cleaning tub; and loading said reusable exhaust tubes onto said second mechanized transport means after said exhaust tubes have been cleaned.

7. The method of claim 1 wherein said first mechanized transport means and said second mechanized transport means are the same type of transport mechanism.

8. The method of claim 1 wherein said first mechanized transport means and said second mechanized transport means are under the control of said image processing.

9. The method of claim 1 wherein said cleaning step further comprises the steps of:

placing, under the control of said image processing, each of said reusable exhaust tubes onto at least one brush in a cleaning tub;

scrubbing each of said reusable exhaust tubes in said cleaning tub with chemicals for a predetermined interval; and rinsing each of said reusable exhaust tubes in said cleaning tub at least one time.

10. The method of claim 9 wherein said cleaning step further comprises the step of closing a cover of said cleaning tub under the control of said image processing.

11. The method of claim 9 wherein said at least one brush is operable to rotate inside each of said reusable exhaust tubes for said predetermined interval and said exhaust tubes are held in a fixed position.

12. The method of claim 9 wherein said scrubbing step occurs in a first compartment of said cleaning tub and said rinsing step occurs in a second compartment of said cleaning tub.

13. The method of claim 1 wherein said reusable exhaust tubes have different diameters and respective ones of said reusable exhaust tubes are placed, under the control of said image processing, onto respective correspondingly sized brushes in a cleaning tub.

14. The method of claim 13 wherein each of said reusable exhaust tubes are operable to rotate for a predetermined interval and said at least one brush is held in a fixed position.

15. The method of claim 1 wherein said prescribed angle is 90 degrees.

16. The method of claim 1 wherein said transporting step further comprises the step of lifting and moving one exhaust tube at a time.

17. The method of claim 1 wherein each of said transporting steps occur at a variable speed.

18. The method of claim 1 wherein said first mechanized transport means and said second mechanized transport means are responsive to signals supplied via said image processing.

* * * * *

UNITED STATES PATENT AND TRADEMARK OFFICE
CERTIFICATE OF CORRECTION

PATENT NO. : 7,629,551 B2  Page 1 of 1
APPLICATION NO. : 11/329581
DATED : December 8, 2009
INVENTOR(S) : Pawlenko et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 781 days.

Signed and Sealed this

Twenty-first Day of December, 2010

David J. Kappos
*Director of the United States Patent and Trademark Office*